(12) United States Patent
Roberts

(10) Patent No.: US 6,885,997 B1
(45) Date of Patent: Apr. 26, 2005

(54) APPARATUS AND METHOD FOR COMPARING RATE PLANS ON A NET-NET BASIS

(75) Inventor: David T. Roberts, Spring, TX (US)

(73) Assignee: Teligistics.Com, The Woodlands, TX (US)

( * ) Notice: Subject to any disclaimer, the term of this patent is extended or adjusted under 35 U.S.C. 154(b) by 0 days.

(21) Appl. No.: 09/505,262

(22) Filed: Feb. 16, 2000

(51) Int. Cl.[7] .............................................. G06F 17/60
(52) U.S. Cl. ........................................ 705/26; 705/27
(58) Field of Search ................ 705/26, 27; 379/114.02, 379/121.01

(56) References Cited

U.S. PATENT DOCUMENTS

| | | | | |
|---|---|---|---|---|
| 5,027,388 A | * | 6/1991 | Bradshaw et al. | 379/112 |
| 5,627,887 A | * | 5/1997 | Freedman | 379/144 |
| 5,659,601 A | * | 8/1997 | Cheslog | 455/406 |
| 5,842,174 A | | 11/1998 | Yanor | |
| 5,881,138 A | * | 3/1999 | Kearns et al. | 379/114.02 |
| 5,881,139 A | | 3/1999 | Romines | |
| 5,920,613 A | * | 7/1999 | Alcott et al. | 379/114.02 |
| 6,023,500 A | * | 2/2000 | Kearns et al. | 379/114.02 |
| 6,252,951 B1 | * | 6/2001 | Alcott et al. | 379/114.03 |
| 6,418,207 B1 | * | 7/2002 | Kearns et al. | 379/114.06 |
| 6,498,840 B1 | * | 12/2002 | Alcott et al. | 379/126 |

FOREIGN PATENT DOCUMENTS

| | | | | |
|---|---|---|---|---|
| JP | 2002245145 A | * | 8/2002 | G06F/17/60 |
| JP | 2003006410 A | * | 1/2003 | G06F/17/60 |

OTHER PUBLICATIONS

Nelson et al., Choosing you long distance route . . . , Management World, v14n7, pp. 16–19, Jul. 1985, (from Dialog file 15, acc. No. 00287418).*
From Dialog file 20, acc. No. 05213117, Internet usage cost to stay, New Straits Times (Malaysia), p06, May 6, 1999.*
From Dialog file 624, acc. No. 01069614, AVISTA 's Internet billing, fuel cell unit . . . , Energy Services & Telecom Report, Jan. 27, 2000, p. 1, Supplement.*

* cited by examiner

*Primary Examiner*—Cuong Nguyen
(74) *Attorney, Agent, or Firm*—Duane Morris LLP

(57) ABSTRACT

An improved apparatus and method for comparing a plurality of rate plans on a net—net basis comprising a computer having a database, the database comprising rate plan characteristics for a plurality of rate plans; an input terminal operatively connected to the computer for entering data; a comparison program executing within the computer for comparing rate plans using the entered data; and an output terminal operatively connected to the computer for reporting the results of the comparison program is used to allow consumers to obtain true net cost comparisons of from a plurality of service plans from one or more service providers. Data are obtained from historical data or theorized and then normalized into appropriate per-second, per-block, or other categories for comparison for each of a set of categories describing the rate plans. Adherence to and influence of differing rate plan options are automatically calculated, and the net result of each rate plan is presented to the consumer for side-by-side comparisons. If an alternative rate plan is attractive to a service provider client, the client or its agent may opt to subscribe to that rate plan in place of the current rate plan, and the service provider notified accordingly.

59 Claims, 6 Drawing Sheets

CURRENT CARRIER: ZZZZZ                                                                    PROPOSED CARRIER: XXXXXX

|  | CURRENT CARRIER | | | PROPOSED CARRIER | | SAVINGS | | |
|---|---|---|---|---|---|---|---|---|
| SERVICES | TOTAL | MINUTES | RATE | TOTAL | RATE | MONTHLY | % | ANNUAL |
| INTERSTATE 1+ | 924.70 | 10877.0 | 0.0849 | 816.53 | 0.0750 | 108.17 | 11.7% | 1,298.04 |
| INTRASTATE 1+ | 109.45 | 950.5 | 0.1151 | 94.10 | 0.0990 | 15.35 | 14.0% | 184.20 |
| LEC INTRASTATE 1+ | 8.34 | 72.0 | 0.1158 | 7.13 | 0.0990 | 1.21 | 14.5% | LEC |
| 800 INTERSTATE | 14.32 | 169.0 | 0.0847 | 12.68 | 0.0750 | 1.64 | 11.5% | 19.68 |
| CALLING CARD | 54.10 | 180.0 | 0.3006 | 25.20 | 0.1400 | 28.90 | 53.4% | 346.80 |
| BRAZIL | 463.60 | 628.0 | 0.7382 | 295.16 | 0.4700 | 168.44 | 36.3% | 2,021.28 |
| CANADA | 6.45 | 38.0 | 0.1697 | 3.80 | 0.1000 | 2.65 | 41.1% | 31.80 |
| FRANCE | 6.36 | 18.5 | 0.3438 | 2.59 | 0.14000 | 3.77 | 59.3% | 45.24 |
| GREECE | 39.13 | 58.8 | 0.6660 | 24.09 | 0.4100 | 15.04 | 38.4% | 180.48 |
| MEXICO - BAND 8 | 15.44 | 18.5 | 0.8346 | 7.77 | 0.4200 | 7.67 | 49.7% | 92.04 |
| UNITED KINGDOM | 14.49 | 63.3 | 0.2291 | 5.69 | 0.0900 | 8.80 | 60.7% | 105.60 |
| DIRECTORY ASSISTANCE | 5.50 | 5.0 | 1.100 | 3.00 | 0.6000 | 2.50 | 45.5% | 30.00 |
| TOTALS | $1,879.36 | 14978.5 | 0.1255 | $1,439.49 | 0.0961 | $439.87 | 23.4% | $5,278.44 |

NOTE: Rates subject to change and tariffs. International calls billed in 6 second increments with a 30 second minimum.

FIG. 7

APPARATUS AND METHOD FOR COMPARING RATE PLANS ON A NET-NET BASIS

TECHNICAL FIELD

The present invention comprises an improved method of comparing rate plans on a net—net basis. It is specifically useful in comparing utility rate plans such as those found in the telecommunications industry. It is further specifically useful in comparing utility rate plans such as those found in the power utility industry.

BACKGROUND ART

The present invention comprises an apparatus and software method for taking two or more rate plans from the same or different providers and providing an output report which indicates a true, net cost, bottom line figure for both plans on a periodic basis (e.g. monthly) to allow an end user to compare the differing rate plans. The report can be a visual report such as on a computer device such as a display, a physical (hard copy) report such as a printed report, or any combination thereof.

Currently, competition for consumers of utilities such as telecommunications, both local and long distance, has generated numerous marketing plans. These plans usually vary in options, add-ons, and other characteristics, making a true comparison of one plan to another plan difficult and often inaccurate. Additionally, competition for consumers in other service areas such as the power utility marketplace is beginning to become a reality.

Given the plethora of competing rate plans and choices, consumers need a tool to allow them to objectively compare various rate plans offered by one service provider against those rate plans offered by competitors on a true, net—net basis, i.e. the net cost to the consumer of a rate plan compared to the net cost to the consumer of an alternative plan. In this sense, "net" includes the bottom line, total cost to the consumer for that service and its component categories.

Some prior art such as U.S. Pat. No. 5,659,601 issued to Cheslog is illustrative. Cheslog '601 processes call detail records obtained from a single provider's data, and specifically obtained from cellular telephony providers in Cheslog, to produce invoices and reports containing consolidated billing, usage, and cost information for current and potential other plans. Cheslog teaches a billing system method comprising the steps of selecting cellular telephone user's records, creating a summary record, accessing peak and non-peak usage minutes, calculating costs based on usage minutes, and selecting a rate plan from a plurality of rate plans that has a lowest calculated cost. Cheslog is limited to cellular telephony and, more specifically, to internal billing practices of a single cellular service provider, and does not provide for nor suggest allowing interactive access to such a comparison, such as may be had using a form driven interface. Moreover, Cheslog only analyzes the traffic pattern of the internal billing generated by that customer for that service provider. There is no suggestion nor teaching to provide comparisons of a cellular service provider to other plans from competing companies. Tariff and rate databases descriptive of other service providers are not considered, nor are they a factor. Further, there is no suggestion nor teaching by Cheslog to provide comparisons of a service provider other than cellular telephony to other plans from competing companies, especially important as differing service providers offer similar or divergent services in similar or divergent categorizations of these services, making it difficult to obtain a true net—net, bottom line comparison. Further still, Cheslog does not teach nor suggest allowing a user or an agent of the user to switch to differing service providers or provide an agent of user who effectuates such a switch to receive financial incentives for effecting the switch.

Accordingly, an improved apparatus and method for comparing a plurality of rate plans using historical data on a net—net basis, each rate plan having differing characteristics, is provided.

SUMMARY OF THE INVENTION

An improved apparatus and method for comparing a plurality of rate plans on a net—net basis are disclosed.

In a preferred embodiment, the improved apparatus for comparing a plurality of rate plans on a net—net basis comprises a computer having a memory; a database resident in the memory, the database having at least one table comprising one or more records, the records comprising one or more fields having a predetermined structure, the records further detailing at least one rate plan characteristic corresponding to each of a plurality of rate plans for services wherein the at least one rate plan characteristic describes each of the plurality of rate plans for services; an input terminal operatively connected to the computer for obtaining usage data, the usage data comprising cost data for the services; a reduction program executing within the computer for reducing the obtained usage data into a set of net cost data comprising reductions of the obtained usage data expressed in units of measure congruent with units of measure of the at least one rate plan characteristic; a comparison program executing within the computer for comparing at least one of the plurality of rate plans to the net cost data; and an output terminal operatively connected to the computer for reporting the results of the comparison program.

In a preferred embodiment, the improved method comprises the steps of obtaining characteristics of a first rate plan; obtaining characteristics of a second rate plan; entering the characteristics of the first rate plan and the characteristics of the second rate plan into one or more tables in a database; obtaining usage data for comparison; computing a first net amount for the usage data using the characteristics of the first rate plan; computing a second net amount for the usage data using the characteristics of the second rate plan; and reporting the first net amount and the second net amount.

Users of the apparatus and method disclosed herein may accordingly objectively compare one rate plan against one or more alternative rate plans on a net—net basis, whether the rate plans are offered by the same or differing service providers. In a preferred embodiment, usage data used for comparison is historical data entered by a user, and the apparatus and method disclosed utilize those data by reducing the data into a net amount and then objectively comparing one rate plan against one or more alternative rate plans on a net—net basis, yielding a true, so-called bottom line comparison to the user. In this manner, a user's actual calling and traffic patterns may be used to find a least expensive rate plan, whether from the same provider or other providers, that matches a customer's traffic.

In a preferred embodiment, and as opposed to the prior art, the apparatus and method provide for interactive entering of these data as well as interactive reporting of the results to the user.

This summary is not intended to be a limitation with respect to the features of the invention as claimed, and these and other objects can be more readily observed and understood in the detailed description of the preferred embodiment and in the claims.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 7 is an example of a report.

GENERAL DESCRIPTION AND PREFERRED MODE FOR CARRYING OUT THE INVENTION

The currently preferred mode for the present invention is for use comparing rate plans offered by long distance telecommunications companies. Therefore, many of the examples herein are directed towards this currently preferred mode. However, it is within the intended scope of the present invention that the improved rate comparison apparatus and method of the present invention is applicable to use by consumers for one or more providers of services in general where these services are characterized by a plurality of rate plans, including by way of example and not limitation power utilities, delivery services such as parcel delivery services, entertainment services such as satellite or cable delivery systems, and other services where the service is provided on an incremental basis such as a per minute or per item basis.

Accordingly, the written description uses a large number of acronyms to refer to various services and system components. Although generally known, use of several of these acronyms is not strictly standardized in the art. For purposes of this discussion, acronyms therefore will be defined as follows:

Digital Subscriber Link (DSL)

Integrated Services Digital Network (ISDN)

Local Area Network (LAN)

Local Access Tariff Area (LATA)

T1 and T3 (signaling methods of certain line speeds used in voice and data telephony)

Although a long distance service provider comparison is used herein to described one preferred embodiment, it is understood and appreciated that the use of long distance service providers is by example only and is not meant to be nor is a limitation with respect to the features of the invention as claimed. The features and other objects of the present invention can be more readily observed and understood in the detailed description of the preferred embodiment and in the claims.

Figure 1:
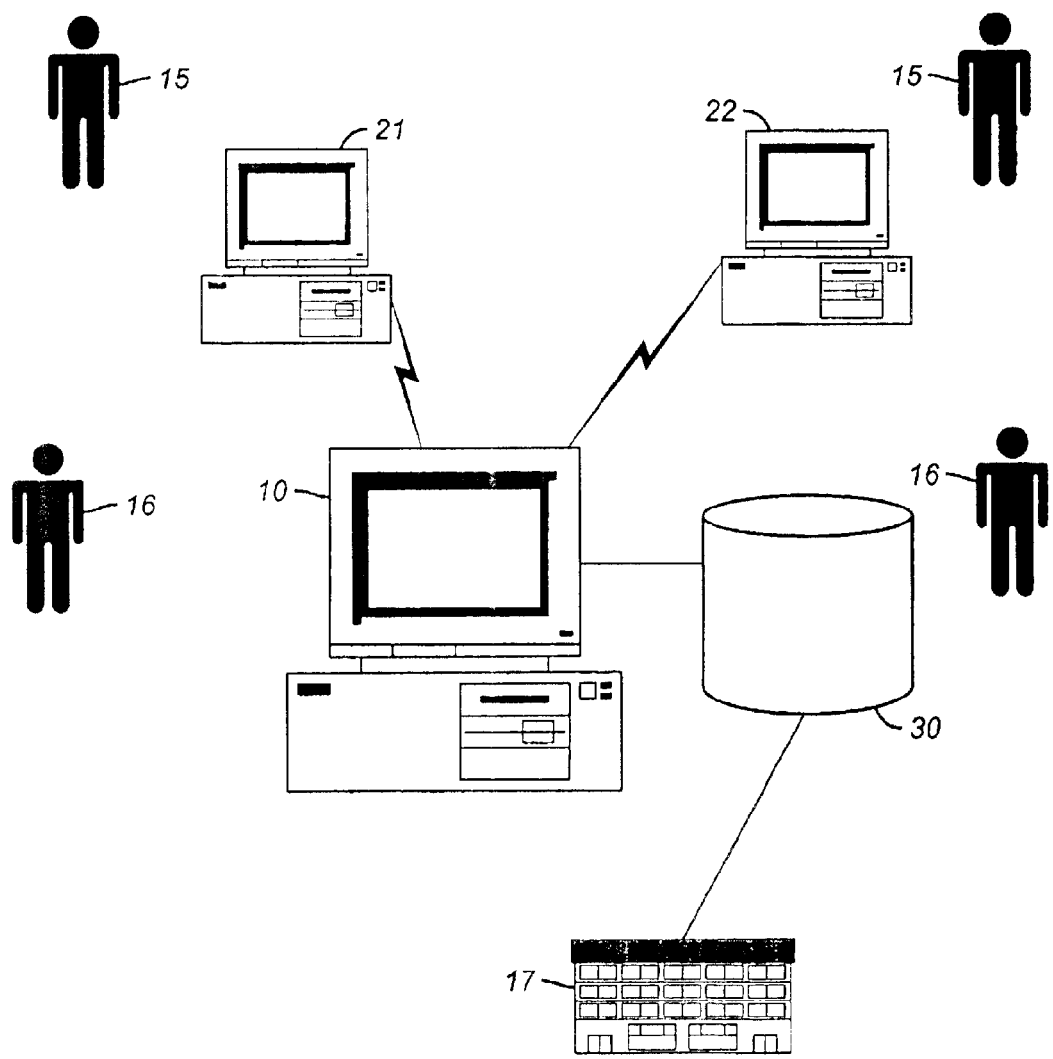
FIG. 1 is a schematic diagram of the present invention.

Referring now to FIG. 1, a schematic diagram of the present invention, the improved rate comparison apparatus of the present invention comprises computer 10 having database 100, input terminal 21, and output terminal 22. In the preferred embodiment, input terminal 21 and output terminal 22 can be the same device, collectively referred to herein as terminal 20. Additionally, terminal 20 may be collocated with computer 10, or data communications network 30 may be present to provide data communications pathways to computer 10 with respect to terminal 20.

Computer 10 may be any computer capable of processing data from database 100 as well as data input for comparison. As those skilled in the computer arts will recognize, computer 10 may range in size and complexity from a mainframe computer such as an INTERNATIONAL BUSINESS MACHINES 3090 series to a personal computer such as those utilizing a microprocessor such as an 80×86 or PENTIUM processor manufactured by INTEL CORP. Memory device 12 is accessible to computer 10 through any means such as those apparent to those skilled in the computer arts such as a local hard magnetic medium drive, CDROM, DVDROM, magento-optical devices, and the like. In an alternative embodiment, memory device 12 may be a separate data storage device operatively in communications with computer 10 such as by LAN, or a read-only electronic memory device such ROM.

Terminal 20 may be collocated with computer 10 which has database 100 and which does the comparison, or, as in a preferred mode, is operatively connected to computer 10 through data communications network 30. In the preferred embodiment, input terminal 21 and output terminal 22 may be a single terminal 20 such as a personal computer. Additionally, terminal 20 may be a device capable with interactive interfacing capabilities such as WEBTV marketed by SONY CORP or any other device capable of interactive interface with computer 10. Further, input terminal 21 may be a batch input device such as, by way of example and not limitation, a card reader, a CDROM reader, an optical recognition device, a magnetic media device such as diskette or tape, or any combination thereof.

Output terminal 22 may be an interactive visual device such as a video terminal, computer terminal, or personal computer; a hard copy output device such as a printer or a facsimile; a memory device such as a CDROM or DVDROM; an electronic device such as a file resident in a memory device such as a file on magnetic or optical media; or any combination thereof.

Data communications network 30 may include terminal multiplexers, local area networks, wide area networks, dial-up bulletin boards, packet switched networks, private networks, public networks, cellular packet data networks, or any combination thereof. In the preferred embodiment, data communications network 30 is the Internet with clients 16 and agents 15 accessing computer 10 through any Internet accessing means, including by way of example and not limitation dial-up, DSL, ISDN, T-1, T-3, satellite, and cable.

Figure 2:
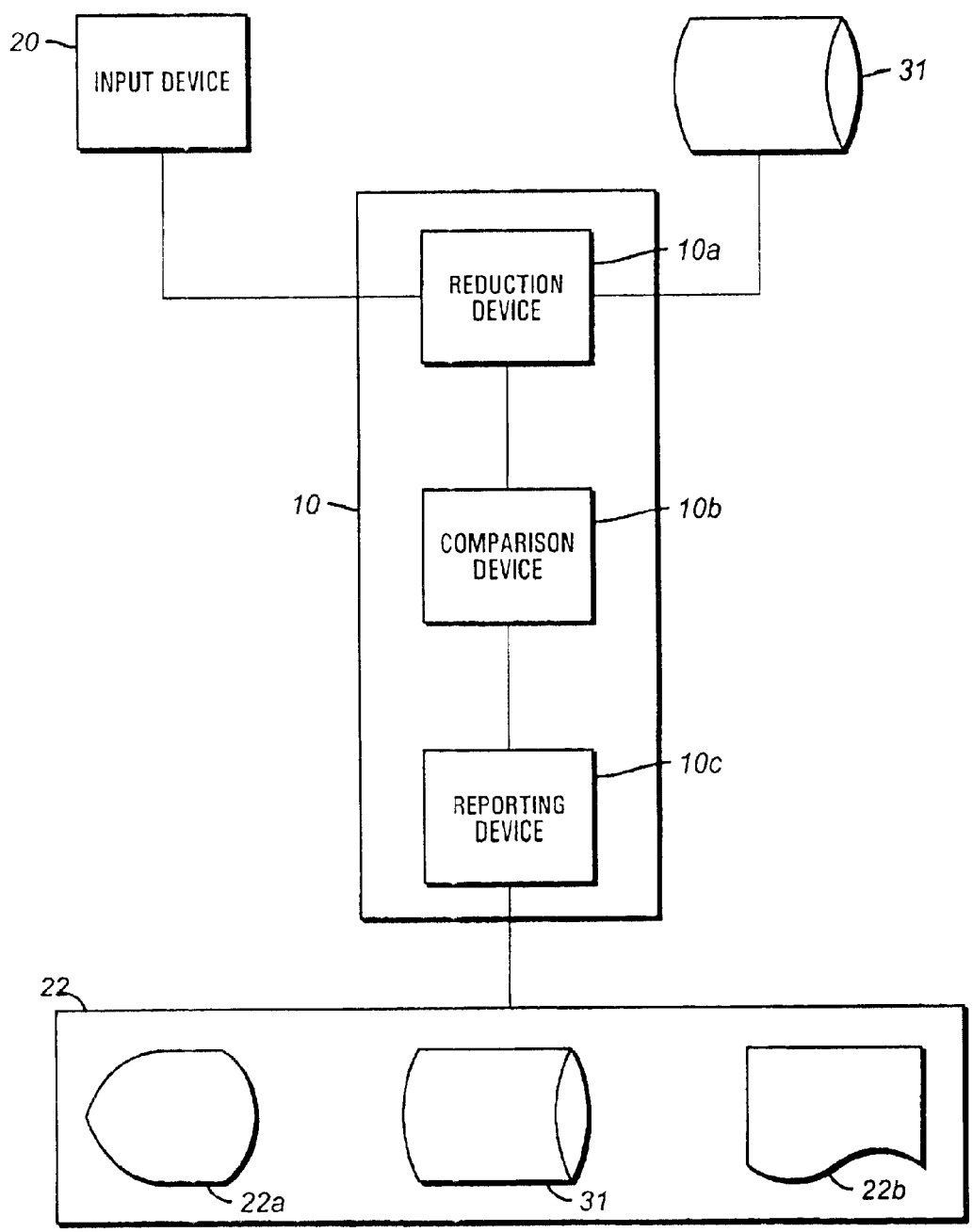
FIG. 2 is a block diagram of the present invention's functions.

Referring now to FIG. 2, a block diagram of the present invention's functions, data are retrieved from either terminal 20, memory 31, or a combination thereof. Terminal 20 is as described herein above, and may be a terminal collocated with computer 10 or operatively connected to computer 10 through data communications network 30, a personal computer, WEBTV, a batch input device such as, by way of example and not limitation, a card reader, a CDROM reader, an optical recognition device, a magnetic media device such as diskette or tape, or any other device capable of interactive or batch interface with computer 10 or any combination thereof. Memory 31 may be magnetic tape, a magnetic drum, magnetic disks, CDROM, optical storage, RAM, ROM, EEPROM, EPROM, flash memory, and/or like storage media.

Once retrieved, data are processed in computer 10 which may include reduction device 10a, comparison device 10b, and reporting device 10c. As those skilled in the computer arts will understand, these devices may be separate computers 10 operatively linked, separate programs operating in a single computer 10, a single program operating in a single computer 10, or combinations thereof.

Reduction device 10a takes usage data as entered into computer 10 and reduces it into a set of data within a predetermined number of categories such that all comparisons can be accomplished using an identical set of categories and all usage data are assigned to one or more categories. The sum of the usage data prior to reduction, including its costs, must equal the sum of the reduced data. Usage data therefore, as in the preferred embodiment, will include per unit measures and costs per unit measure, e.g. billing increments such as 6 second or per line and cost per billing increment such as cost per 6 seconds and cost per line. Usage data so reduced will be described in a set of categories that are congruent with the categories of rate plan characteristics in database 100.

Comparison device 10b takes reduced usage data and compares each category of reduced usage data with each category of a selected rate plan or a category to congruent category basis.

Reporting device 10c generates a set of reporting data from the results of comparison device 10b. In the preferred embodiment, these reporting data are organized for formatted reports 60 where reports 60 can be created as paper printouts, visual displays, binary data encapsulated in binary files such as on magnetic media or optical media. Reports 60 may be storable onto memory 31 for later retrieval.

Once reduced and compared, report 60 may be formatted for or otherwise viewed as by display on output terminal 22 which may be a video display 22a or a hard copy device such as printer 22b.

Figure 3:
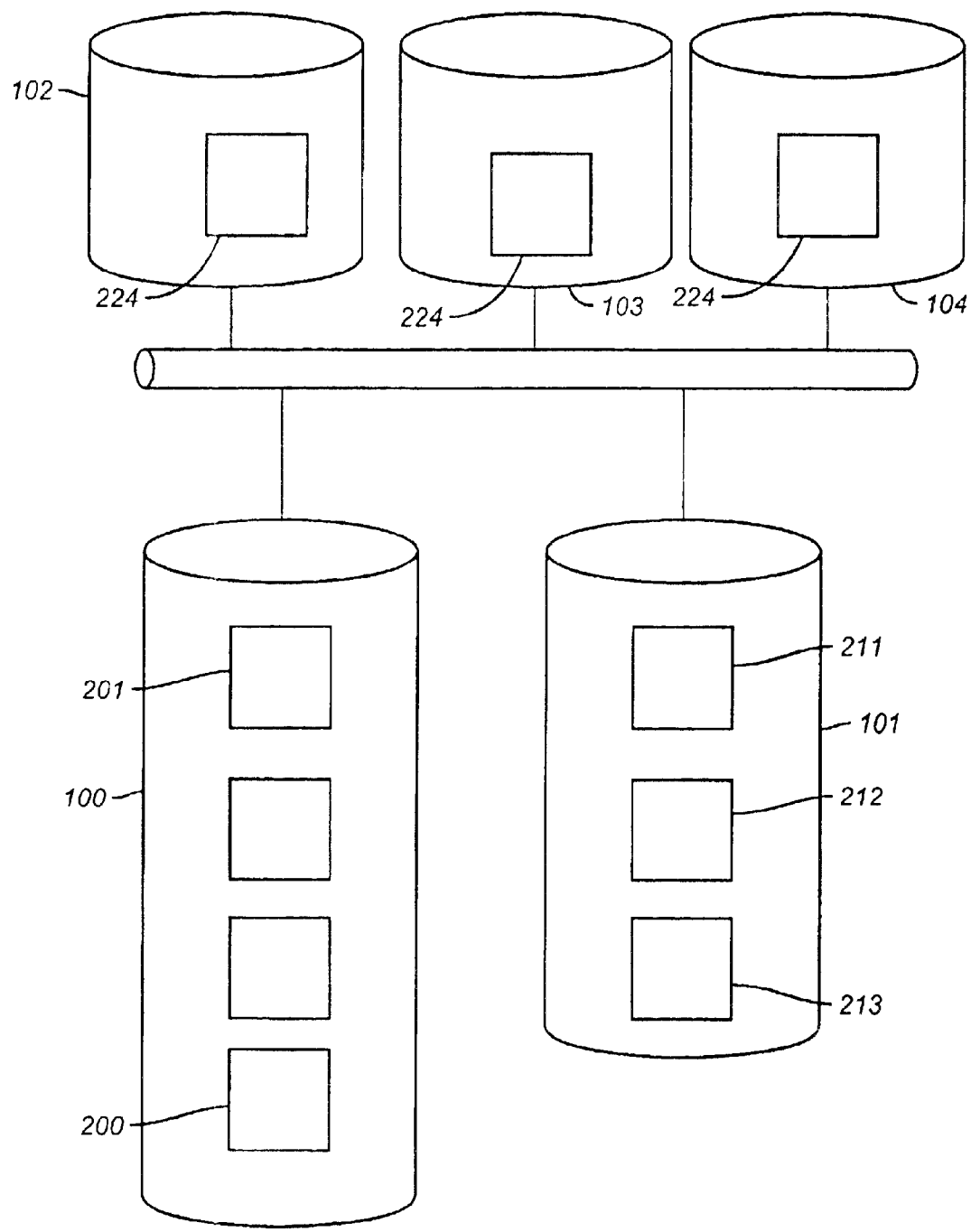
FIG. 3 is a schematic representation of several databases and their tables.

Referring now to FIG. 3, a schematic representation of several databases and their tables, as will be appreciated by those skilled in the computer arts, database 100 is maintained on memory device 12 accessible to computer 10 and comprises one or more tables 200 having predetermined structures organized into records having fields descriptive of predetermined categories. In the preferred embodiment, database 100 may be a plurality of databases 100, although those skilled in the computer science arts will under understand that placement and relation of tables 200, either free or bound, and/or databases 100 can be accomplish in numerous, operationally equivalent ways. In the preferred embodiment, a plurality of tables 200 are used to describe various rate plan and user characteristics.

One or more plan rate databases 102 may comprise tables 200 containing descriptions of various rate plans offered by one or more service providers 17, by way of example and not limitation describing non-foreign, foreign, local, LATA, Internet, and other rate plan characteristics comprising plan identifiers, monthly fees, billing increments, and minimum volumes for inter/intra-state plans. Alternatively, rate plan database 102 may be part of database 100. Further, rates may be described in per increment values, comprising per minute, second, or some other predefined increment capable of being normalized. Some services, such as Internet services, may require additional rate descriptions, by way of example and not limitation comprising dial-up account rates and Internet access plan. Other rates may be described in per unit values, such as per month or per line.

Accordingly, by way of example and not limitation, at least one table 200 comprises rate plan characteristics table 201 having a predetermined structure with one or more fields comprising descriptions of categories of services offered by service providers 17 as well as other fields with predetermined scope such as notes, general information, and the like. These fields comprise rate information such as per unit descriptors, e.g. per day or per minute, as well as block descriptors such as per line charges or flat fees and the like. In the preferred embodiment, one field exists per each of the possible charges and/or categories 61 (not shown in FIG. 3) of charges, including optional charges, provided by service provider 17. By way of example and not limitation, for a preferred embodiment for telephony providers, rate plan characteristics table 201 may include rate plan characteristics such as units of measure and cost per units of measure for local, LATA, outbound 800 service, 800 inbound service, calling card, minimum fees, and international fees where the units of measure may be on per line, per minute, per month, or other incremental cost bases as required by that rate plan. It is understood that in the preferred embodiment each service provider 17 may require and be described in one or more entries in rate plan characteristics table 201, e.g. one entry per each rate plan offered by each service provider 17.

In a preferred embodiment, an identity database 101 may be present that comprises one or more tables 200 containing characteristics about participants such as agents 15, clients 16, and service providers 17. These characteristics may be contained in a single table 200, or in separate tables such as agent table 211, client table 212, and service provider table 213 within identity database 101. Alternatively, identity database 101 may be part of database 100 along with any of its associated tables.

Agents 15 may be agents of one or more service providers 17, or one or more clients 16, or a combination thereof. By way of example and not limitation, when analysis report 60 is made (not shown in FIG. 3), an agent's 15 name, phone number, fax number and email may be obtained from agent table 211 for reporting purposes. Similarly, agent table 211 may be linked to one or more client records in client table 212, e.g. to that agent 15 that entered or caused to be entered those clients 16 into client table 212. The linkage may be either relational or via any other database linkage means, all of which are familiar to those skilled in the computer sciences arts.

Clients 16 are current or proposed users of one or more services offered by one or more service providers 17 where the services provided are capable of description according to one or more rate plans. Client table 212 may contain information about clients 16, including by way of example and not limitation a name to appear on report 60 and client's 16 current service provider 17 such as client's 16 current long distance company. The information about a client's 16 current service provider 17 is used to create a comparison on analysis report 60. Accordingly, agent 15 and/or client 16 may run several rate comparison scenarios with different potential service providers 17 without having to reenter the information about the current service provider 17.

In one embodiment, service provider table 213 may contain information about one or more service providers 17 such as name, address, contact information, referral fees, commissions, and the like as well as linkages to information regarding one or more agents 15 and/or clients 16. The name of a service provider 17 may be taken from this table 200 to be shown on report 60.

In an alternate embodiment one or more custom databases 103 may be present to accommodate nonstandard data. Alternatively, custom database 103 may be part of database 100.

By way of example and not limitation, custom database 103 may contain information about characteristics of custom domestic plans such as where one or more rates per plan exist per different political division such as a state or a country. In an embodiment for long distance telephony service providers, for example, custom databases 103 may be used for specialized plans such as individually contracted rates, dedicated lines and so one.

One or more order tracking databases 104 may exist, comprising at least one order tracking table 241 comprising descriptions of products and services that can be ordered by a client. Alternatively, tracking database 104 may be part of database 100.

Utilizing order tracking databases 104, an order for services as provided by one or more service providers 17 may be tracked and related to one or more clients 16 as well as one or more agents 15. By way of example and not limitation, these relations may enable tracking the agent 15 that placed the order, the client 16 that the agent 15 placed the order for, the product or service that was ordered, as well as an order date and tracking number.

Figure 4:
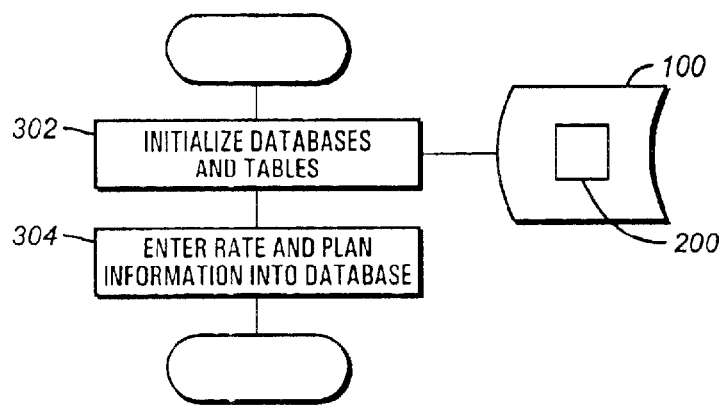
FIG. 4 is a flowchart of initial steps.

In the operation of the preferred embodiment, referring now to FIG. 4, a flowchart of initial steps, one or more databases 100 are initialized 302 such that one or more tables 200 contain rate plan characteristics of a plurality of rate plans from one or more service providers 17. In the preferred embodiment, the characteristics are from a plurality of service providers 17. Rate plan characteristics must be reduced into the categories required by database 100 prior to entry into database 100. Accordingly, rate plan characteristics may be obtained from service provider 17 in a format corresponding exactly to database 100 requirements, in a format that requires additional processing by human beings, in a format that may be reduced into the categories required by database 100, or a combination thereof.

In a preferred embodiment, database 100 encompasses at least one rate plan characteristics table 201, at least one agent table 211, at least one client table 212, at least one service provider table 213, and at least one order tracking table 241.

Information including rate and plan information are then entered 304 into databases 100. The rate and plan information entered into one or more tables 200 in database 100 may be kept up to date by a webmaster or database administrator (not shown in the Figures), and does not need to be reentered by agents 15. Additionally, agents 15 may enter information 306 about themselves, their clients 16, and, occasionally, custom rates. The data entry may be via interactive means, batch means, or any combination thereof.

Figure 5:
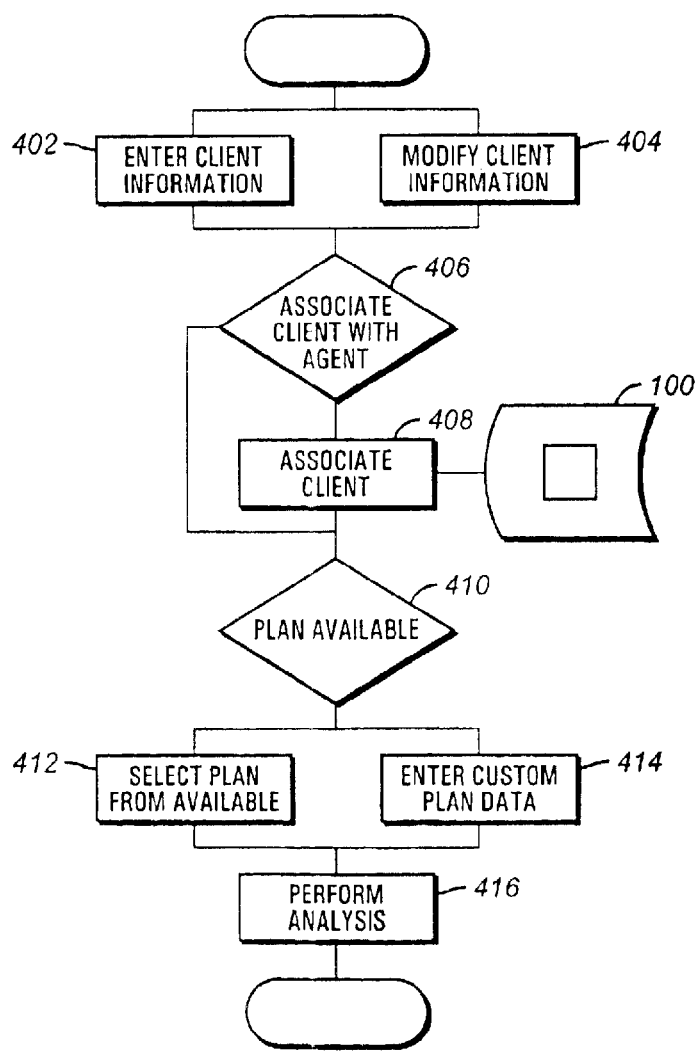
FIG. 5 is a flowchart of usage data entry and reduction.

Referring now to FIG. 5, a flowchart of usage data entry and reduction, from a terminal 20 such as by an interactive form an agent 15 or a client 16 can enter information 402 on a new client 16 or modify information 404 about an existing client 16. Data concerning clients 16 may be entered via an interactive client information form, by processing scanned data such as optical recognition methods, by batch, or a combination thereof. These data may include current or proposed service usage data such as phone bill information comprising interstate, intrastate, LEC interstate, toll-free interstate, toll-free intrastate, toll-free Canadian, calling card, international and cellular long distance charges, services, fees and discounts such as directory assistance, plan fees, toll-free fees, Internet charges, and plan discounts. Client information entered in database 100 may be associated the agent 15 that entered it so that the information can be used at a later time by that agent 15 and so that other agents 15 cannot access information about clients 16 other than their own.

In the preferred embodiment, data are entered in one or more fields in tables 200 indicating characteristics about usage such as a total billed for each reported category 61 of usage and the time associated with each billing category 61, thereby allowing a normalized rate to be calculated when the analysis is done. Time may be entered in hours, minutes and seconds or as a floating-point minute number.

Information about a client 16 may also be deleted from database 100 by an appropriate means such as via an option from an interactive form, by batch, or a combination thereof by someone with appropriate authority to delete the client information such as the agent 15 who entered the data originally. In the preferred embodiment, client information is not allowed to be deleted if the client 16 is currently being tracked due to an order entered.

If a particular set of plan rate characteristics is not in database 100 as a standard plan, plan rate characteristics for a custom plan may be entered 414. These plan rate charactertistics are usually quite specialized. In a preferred embodiment of long distance telephony services, custom plan data may include pricing and descriptive information for dedicated lines, T-1 Internet access, special contracts, or other services or for services in plans that are so new they have not been entered into database 100. In the preferred embodiment, only the creator of the custom plan may modify the custom plan. Data for the custom plan may be entered by an interactive form, by batch, or a combination thereof.

In any case, these plan rate characteristics, once they are entered into database 100, may be used by an agent 15 to run an analysis 416.

Figure 6:
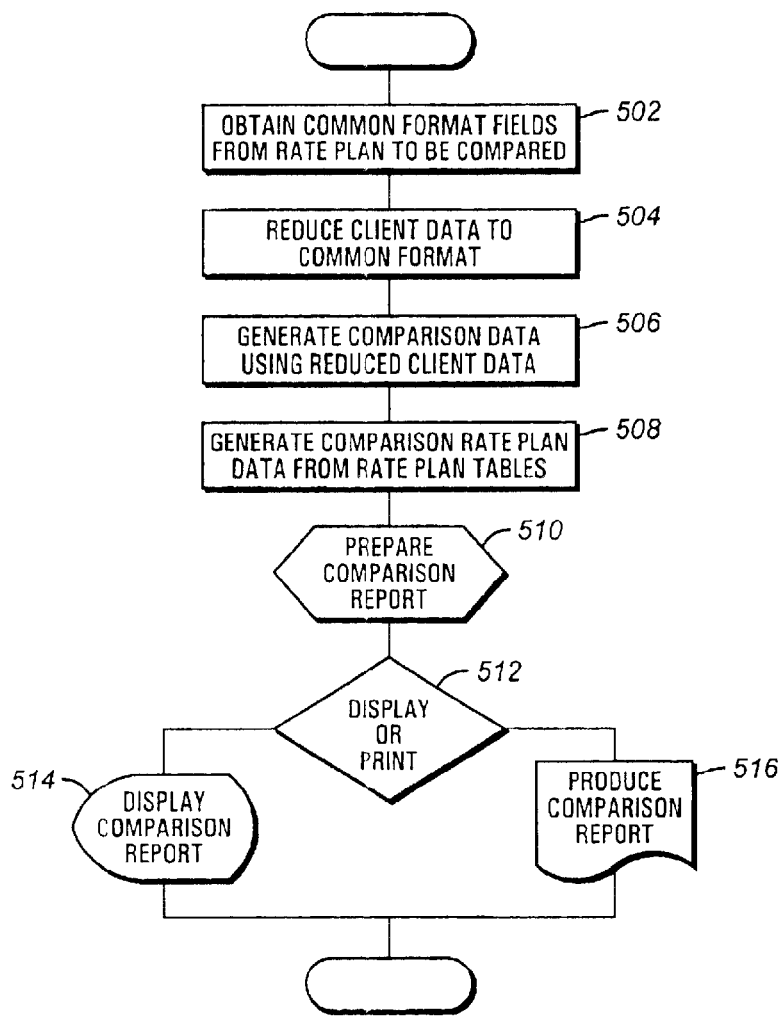
FIG. 6 is a flowchart showing reduction and reporting.

Referring now to FIG. 6, a flowchart showing reduction and reporting, once information has been entered into database 100, and FIG. 7, an exemplary report, an analysis can be done. Data reduction rules 502 are obtained from common format fields whereby all services may be reduced into a least common comparative value, e.g. per minute costs or per line usage. This may be accomplished by segregating usage and/or rate plan charges into a plurality of categories 61, each category 61 being described by one or more fields in one or more tables 200. By way of example and not limitation, a category 61 may be described by a field defining a unit of measure such as per minute or per second and a field defining a unit of charge per unit of measure such as a dollar or portion of a dollar charged per unit measure, e.g. LATA calls are charged $0.06 per six second increments.

Usage data as entered by agent 15 or client 16, either actual or proposed, are then reduced 504 to net amounts which are congruent with, and therefore capable of comparison on equal bases with, common format fields. As used herein, "congruent" means reduced into a common set of categories 61 wherein some of the categories 61 may have zero amounts. Comparison data are then generated at steps 506 and 508 which allow a true net—net comparison between usage data. That is, usage data are reduced to one set of net costs for a client 16 and net costs for one or more service providers' 17 rate plans where the net costs are based on equivalent sets of per unit measures for the services proposed for the categories 61 defined. All usage data are placed into at least one category 61 such that a total amount of all charges for usage data equals the actual total charges by a current service provider 17 for that client 16.

In a preferred embodiment, when the analysis is run and report 60 generated 510, an amount in a rate column such as 62*a* or 63*a* may be obtained from an appropriate table 100 for a selected plan. Accordingly, before an analysis is done, a proposed service provider plan must be selected. Amounts for the proposed service provider 17 are then calculated such as by multiplying the proposed rate by the total minutes as entered for client 16 for each category 61 of charges that would be assessed client 16. Standard plan fees plus any fees or discounts present for client 16, e.g. as entered by client 16 or agent 15, may be factored in as well to provide a true, net amount for comparisons, i.e. the total actual costs for client 16 for current service provider 17 and for proposed service provider 17. Monthly or other periodic savings may then be reported showing the difference between the proposed total and the current total columns such as at 69. Percent savings may also be reported for ease of understanding as well as annualized savings.

Figure 8:
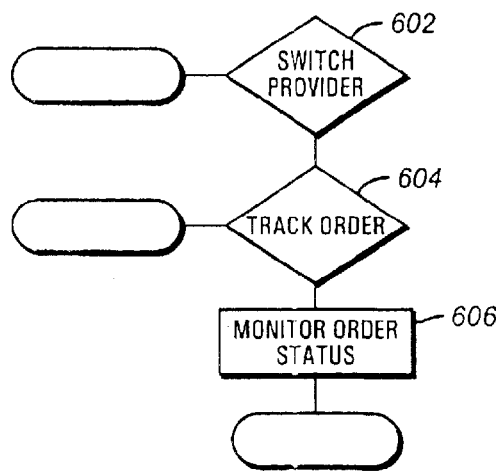
FIG. 8 is a flowchart showing additional capabilities.

Referring now to FIG. 8, an exemplary report, report 60 is generated 410 with one or more comparison details, by way of example and not limitation current details 62 about current service provider 17, proposed details 63 about proposed service provider 17, and comparison details 64 on savings between the current and proposed service providers 17, if any, as well as information labels and notes 65. By way of example and not limitation, these details shown in analysis report 60 may include information entered about the client information from about the client's 16 phone bill plus the normalized rate. In a preferred embodiment of telephony service provides, the plan may include services such as domestic, international and Internet services as well as custom fees and/or discounts. Notes 65 may be included on report 60, such as text describing special conditions or features associated with a particular plan, billing increments, minimum volume requirements, ISP features, and the like.

Report 60 generated may be labeled with information from one or more databases 100. By way of example and not limitation, report title 66 may include detail on the name of the client 16 or client's 16 company, current service provider name 67, proposed service provider name 68, agent's 15 name (if any—not shown in FIG. 7), addresses such as e-mail, and phone numbers (if any—not shown in FIG. 7). Any of these may be optionally suppressed, e.g. by un-checking a check box on an interactive form or setting a reporting option (not shown in FIG. 7).

In the preferred embodiment, although most data are password or otherwise securely protected, report 60 does not need to be. This allows an agent 15 to create an online version of report 60 and email a link to that report 60 to that agent's 15 client 16 so that client 16 may view it 514 from client's 16 own Internet connection without need for a password. In an alternative embodiment, a password or other code may be included in the link to report 60. In a further alternative embodiment, a hard copy version of report 60 may be generated 516.

Referring now to FIG. 8, a flowchart showing additional capabilities, once report 60 is created, client 16 may choose to switch 602 service providers 17 to obtain the savings outlined in report 60. When this happens, agent 15 may make arrangements with the new service provider 17 and have client 16 fill out the necessary paperwork, or client 16 may fill out the paperwork alone. The data required may be entered via terminal 20 such as by a form, and some of the data may be automatically retrieved from database 100.

The order generated may be tracked 604 within the system, including tracking the actual service that was ordered by one or more service identifiers such as part number or other description, the date of the order and reference number of the order. In a telephony embodiment, the reference number may comprise a billing telephone number. Clients 16 and their orders may thus be associated with an agent 15, allowing that agent 15 to obtain credit from a service provider 17 for the order. The order status may be tracked and monitored 606 until completion of the order.

It may be seen from the preceding description that an improved rate comparison apparatus and method has been provided.

It is noted that the embodiment of the improved rate comparison apparatus and method described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An improved apparatus for comparing a plurality of rate plans on a net—net basis, the improved apparatus comprising:
   a. a computer having a memory;
   b. a database resident in the memory, the database having at least one table comprising one or more records, the records comprising one or more fields having a predetermined structure, the records further detailing at least one rate plan characteristic corresponding to each of a plurality of rate plans for services;
   c. an input terminal operatively connected to the computer for obtaining usage data, the usage data comprising cost data for the services;
   d. a reduction program executing within the computer for reducing the obtained usage data into a set of net cost data comprising reductions of obtained usage data into commonly denominated data expressed in units of measure congruent with units of measure of the at least one rate plan characteristic;
   e. a comparison program executing within the computer for comparing at least one of the plurality of rate plans to the net cost data; and
   f. an output terminal operatively connected to the computer for reporting the results of the comparison program.

2. The improved apparatus for comparing a plurality of rate plans on a net—net basis of claim 1 further comprising a data communications network.

3. The improved apparatus for comparing a plurality of rate plans on a net—net basis of claim 2 whereby the input terminal is operatively connected to the computer through the data communications network.

4. The improved apparatus for comparing a plurality of rate plans on a net—net basis of claim 2 whereby the output terminal is operatively connected to the computer through the data communications network.

5. The improved apparatus for comparing a plurality of rate plans on a net—net basis of claim 2 wherein the data communications network is at least one of a terminal multiplexers, a local area networks, a wide area networks, a packet switched networks, a dial-up networks, a private data networks, a public data networks, or a cellular packet data networks.

6. The improved apparatus for comparing a plurality of rate plans on a net—net basis of claim 1 wherein the services are telephony services.

7. The improved apparatus for comparing a plurality of rate plans on a net—net basis of claim 1 wherein the rate plan characteristic comprises at least one of a local rate characteristics, a local access and transport area (LATA) rate characteristics, an intrastate rate characteristics, an interstate rate characteristics, an Internet rate characteristics, a cellular rate characteristics, a paging rate characteristics, a voice rate characteristics, a video rate characteristics, an international rate characteristics, an incoming toll-free rate characteristics, or an outgoing toll-free rate characteristics.

8. The improved apparatus for comparing a plurality of rate plans on a net—net basis of claim 1 wherein the database further comprises a custom rate table comprising at least one rate plan characteristic corresponding to a rate plan for services not otherwise contained within the database.

9. The improved apparatus for comparing a plurality of rate plans on a net—net basis of claim 1 wherein the rate plan characteristics comprises a charges per a predetermined increment.

10. The improved apparatus for comparing a plurality of rate plans on a net—net basis of claim 9 wherein the predetermined increment is an increment of time.

11. The improved apparatus for comparing a plurality of rate plans on a net—net basis of claim 1 wherein the rate plan characteristics comprises a cost data describing service provider service offerings available to a user of the service offerings.

12. The improved apparatus for comparing a plurality of rate plans on a net—net basis of claim 1 wherein the cost data comprise data describing total units consumed and prices charges for each unit.

13. The improved apparatus for comparing a plurality of rate plans on a net—net basis of claim 1 wherein the rate plan characteristics comprises a plurality of categories.

14. The improved apparatus for comparing a plurality of rate plans on a net—net basis of claim 13 wherein the categories comprise units of measure and cost per unit of measure for rate plan characteristics.

15. The improved apparatus for comparing a plurality of rate plans on a net—net basis of claim 1 wherein the database further comprises at least one table comprising descriptions of agents of service providers, clients of service providers, and service providers.

16. The improved apparatus for comparing a plurality of rate plans on a net—net basis of claim 15 wherein the descriptions of agents comprise an agent's name, an agent's phone number, an agent's fax number, an agent's email, and one or more client records to be associated with an agent.

17. The improved apparatus for comparing a plurality of rate plans on a net—net basis of claim 15 wherein the descriptions of clients comprise a name to appear on a report, and current service provider information.

18. The improved apparatus for comparing a plurality of rate plans on a net—net basis of claim 15 wherein the descriptions of service providers comprise names, addresses, contact information, referral fees and commissions.

19. The improved apparatus of claim 1 wherein the input terminal is a batch input terminal.

20. The improved apparatus of claim 1 wherein the input terminal is an interactive input terminal.

21. The improved apparatus of claim 1 wherein the output terminal is a visual display device.

22. The improved apparatus of claim 1 wherein the output terminal is a personal computer.

23. The improved apparatus of claim 1 wherein the output terminal is file capable of storage on at least one of (i) a magnetic medium or (ii) an optical medium.

24. The improved apparatus of claim 1 wherein the output terminal is a printer.

25. The improved apparatus of claim 1 wherein the output terminal is selected from the group of output terminals consisting of interactive visual devices, hard copy output devices, memory devices, and electronic devices.

26. An improved apparatus for comparing a plurality of rate plans on a net—net basis, the improved apparatus comprising:
   a. a computer having a memory;
   b. a database stored in the memory, the database having at least one table comprising one or more records of a predetermined structure whereby the records comprise categories of at least one rate plan characteristic corresponding to each of a plurality of rate plans for each of a plurality of rate plans for services;
   c. an input means operatively connected to the computer for obtaining usage data, the usage data comprising cost data for the services;
   d. a reduction program executing within the computer for reducing the obtained usage data into a set of net cost data wherein the obtained usage data are reduced to a set of commonly denominated data expressed in units of measure congruent with units of measure of the at least one rate plan characteristic;
   e. a comparison program executing within the computer for comparing at least one of the plurality of rate plans to the net cost data; and
   f. an output means operatively connected to the computer for reporting the results of the comparison program.

27. The improved apparatus of claim 26, further comprising a results storage means.

28. The improved apparatus of claim 26, wherein the results storage means comprise a region of the memory.

29. The improved apparatus of claim 26, further comprising a data communications network intermediate between the computer and the output means.

30. The improved apparatus of claim 26, further comprising a data communications network intermediate between the computer and the input means.

31. The improved apparatus of claim 29 or 30, wherein the data communications network selected from the group of data communications networks consisting of terminal multiplexers, local area networks, wide area networks, packet switched networks, dial-up networks, private networks, public networks, and cellular packet data networks.

32. The improved apparatus of claim 26 wherein input means are batch input means.

33. The improved apparatus of claim 26 wherein the input means are interactive input means.

34. The improved apparatus of claim 26 wherein the output means is a display device.

35. The improved apparatus of claim 26 wherein the output means is a personal computer.

36. The improved apparatus of claim 26 wherein the output means is file capable of storage on magnetic or optical media.

37. The improved apparatus of claim 26 wherein the output means is a printer.

38. The improved apparatus of claim 26 wherein the output means is selected from the group of output means consisting of interactive visual devices, hard copy output devices, memory devices, and electronic devices.

39. The improved apparatus of claim 26 wherein the input means is a personal computer.

40. The improved apparatus of claim 26 wherein the categories comprise units of measure and a cost per each unit of measure.

41. The improved apparatus of claim 26 wherein the usage data are actual, historical data.

42. An improved apparatus for comparing a plurality of rate plans on a net—net basis, the improved apparatus comprising:
   a. a memory device for containing a database, the database describing the plurality of rate plans as a plurality of records in one or more tables, each of the records comprising predetermined structures describing at least one rate plan category for each of the plurality of rate plans and at least one of the records serving as a first reference record;
   b. an input device for accepting a set of usage data which represent usage and cost information for a service;
   c. a reduction device for reducing the set of usage data, the reduction device capable of converting the usage and cost data into a reduced record comprising commonly denominated data associated with one or more categories congruent with the rate plan categories;
   d. a comparison device, for comparing each category of the reference record to each congruent category of the reduced record;
   e. a reporting device for creating a report comprising results of the comparison device for each category of the reference record and each category of the reduced record and each difference between each category of the reference record and each category of the reduced record; and
   f. an output device operatively coupled to the comparison device, for outputting the report.

43. The improved apparatus of claim 42, further comprising storage device for storing the report.

44. The improved apparatus of claim 42, further comprising a data communications network disposed intermediate between the computer and the output device.

45. The improved apparatus of claim 42, further comprising a data communications network disposed intermediate between the computer and the input device.

46. The improved apparatus of claim 44 or 45, wherein the data communications network is selected from the group of data communications networks consisting of terminal multiplexers, local area networks, wide area networks, packet switched networks, dial-up networks, private networks, public networks, and cellular packet data networks.

47. The improved apparatus of claim 42 wherein input device is a batch input device.

48. The improved apparatus of claim 42 wherein the input device is an interactive input device.

49. The improved apparatus of claim 42 wherein the input device is a personal computer.

50. The improved apparatus of claim 42 wherein the reduction device is a computer having a reduction program executing within the computer.

51. The improved apparatus of claim 42 wherein the comparison device is a computer having a comparison program executing within the computer.

52. The improved apparatus of claim 42 wherein the reporting device is a computer having a reporting program executing within the computer.

53. The improved apparatus of claim 42 wherein the output device is a visual display device.

54. The improved apparatus of claim 42 wherein the output device is a personal computer.

55. The improved apparatus of claim 42 wherein the output device is a file capable of storage on magnetic or optical media.

56. The improved apparatus of claim 42 wherein the output device is a printer.

57. The improved apparatus of claim 42 wherein the output device is selected from the group of output means consisting of interactive visual devices, hard copy output devices, memory devices, and electronic devices.

58. The improved apparatus of claim 42 wherein the categories comprise units of measure and a cost per each unit of measure.

59. The improved apparatus of claim 42 wherein the usage data are actual, historical data.

\* \* \* \* \*